(12) United States Patent
Pietzsch et al.

(10) Patent No.: US 10,860,298 B2
(45) Date of Patent: Dec. 8, 2020

(54) METHOD AND SYSTEM FOR EDITING A BLOCK DIAGRAM MODEL

(71) Applicant: dSPACE digital signal processing and control engineering GmbH, Paderborn (DE)

(72) Inventors: Torsten Pietzsch, Paderborn (DE); Wolfgang Trautmann, Paderborn (DE); Christian Witte, Schlangen (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 16/181,781

(22) Filed: Nov. 6, 2018

(65) Prior Publication Data
US 2019/0294421 A1    Sep. 26, 2019

(30) Foreign Application Priority Data
Mar. 21, 2018    (DE) .......................... 10 2018 106 654

(51) Int. Cl.
G06F 9/44    (2018.01)
G06F 8/35    (2018.01)
G06F 8/20    (2018.01)
G06F 8/10    (2018.01)
G06F 8/34    (2018.01)

(52) U.S. Cl.
CPC .................. *G06F 8/35* (2013.01); *G06F 8/10* (2013.01); *G06F 8/20* (2013.01); *G06F 8/34* (2013.01)

(58) Field of Classification Search
CPC ..... G06F 8/35; G06F 8/10; G06F 8/20; G06F 8/34
See application file for complete search history.

(56) References Cited

U.S. PATENT DOCUMENTS

| | | | |
|---|---|---|---|
| 2007/0169039 A1* | 7/2007 | Lin ........................... | G06F 8/35 717/146 |
| 2008/0092109 A1* | 4/2008 | Kinnucan, Jr. ........... | G06F 8/10 717/105 |
| 2010/0293528 A1* | 11/2010 | Austin ...................... | G06F 8/34 717/113 |
| 2011/0138353 A1* | 6/2011 | Niere ................. | G05B 19/0426 717/104 |
| 2012/0005611 A1* | 1/2012 | Wey ........................ | G06F 9/451 715/771 |

(Continued)

*Primary Examiner* — Duy Khuong T Nguyen
(74) *Attorney, Agent, or Firm* — Muncy, Geissler, Olds & Lowe, P.C.

(57) ABSTRACT

A computer-implemented method for editing one or more properties of one or more model elements in a block diagram of a technical computing environment. The model elements include blocks and variables in blocks, wherein one or more properties are assigned to each model element. The technical computing environment has a model editor, a data definition tool and a code generator. A processor of a host computer opens a block diagram in the model editor, displays a list of model elements present in the block diagram, receives a selection of one or more model elements, highlights the selected model elements, receives an edit command to set a new value for a chosen property of the selected model elements, and sets the chosen property to the new value. A non-transitory computer readable medium and a computer system is also provided.

18 Claims, 8 Drawing Sheets

(56) References Cited

U.S. PATENT DOCUMENTS

| | | | |
|---|---|---|---|
| 2013/0198713 A1* | 8/2013 | Zhang | G06F 17/13 |
| | | | 717/106 |
| 2015/0106068 A1* | 4/2015 | Boys | G05B 17/02 |
| | | | 703/2 |
| 2015/0261660 A1* | 9/2015 | Shiraishi | G06F 11/3688 |
| | | | 714/38.1 |
| 2018/0347498 A1* | 12/2018 | Maloney | F02D 41/26 |
| 2019/0163452 A1* | 5/2019 | Hoffmann | G06F 8/35 |
| 2020/0050434 A1* | 2/2020 | Mair | G06F 8/34 |
| 2020/0201608 A1* | 6/2020 | Wallbaum | G06F 8/35 |

\* cited by examiner

| Stat. | Name (Mod.) | VariableName (...) | Type (ModelElem.) | Description | Class | Type | LSB | Arb. | Offset | Min | Max | Scaling | Width |
|---|---|---|---|---|---|---|---|---|---|---|---|---|---|
| ☐ | REF | Output | TL_Inport | | default | UInt16 | 2^-11 | 0 | 0 | | | | 1 |
| ☐ | Y | Output | TL_Inport | | default | UInt16 | 2^-11 | 0 | 0 | | | | 1 |
| ☐ | K | Gain | TL_Gain | integral gain factor | STATIC_CAL | Int8 | 2^-6 | 0 | 0 | | | | inherited |
| ☐ | Ki | Output | TL_Gain | | default | Int16 | 2^-6 | 0 | 0 | | | | inherited |
| ☐ | Kp | Gain | TL_Gain | proportional gain fact. | STATIC_CAL | Int8 | 2^-3 | 0 | 0 | | | | inherited |
| ☐ | Kp | Output | TL_Gain | | default | Int16 | 2^-6 | 0 | 0 | | | | inherited |
| ☐ | Unit Delay | Output | TL_UnitDelay | | default | UInt16 | 2^-6 | 0 | 0 | | | | inherited |
| ☐ | Unit Delay | State | TL_UnitDelay | | default | UInt16 | 2^-10 | 0 | 0 | * | * | * | inherited |
| ☐ | e | Output | TL_Sum | | default | Int16 | 2^-6 | 0 | 0 | | | | inherited |
| ☐ | sU | Output | TL_Sum | this is the controller.. | STATIC_DISP | Int16 | 2^-6 | 0 | 0 | | | | inherited |
| ☐ | x | Output | TL_Sum | | default | Int16 | 2^-6 | 0 | 0 | | | | inherited |
| ☐ | U | Output | TL_Outport | | default | Int16 | 2^-6 | 0 | 0 | | | | inherited |

Fig. 8

| Stat. | Name (Mod.) | VariableName (...) | Type (ModelElem...) | Description | Class | Type | LSB | Arb. | Offset | Min | Max | Scaling | Width |
|---|---|---|---|---|---|---|---|---|---|---|---|---|---|
| | REF | Output | TL_Inport | | default | UInt16 | 2^-11 | 0 | 0 | | | | 1 |
| | Y | Output | TL_Inport | | default | UInt16 | 2^-11 | 0 | 0 | | | | 1 |
| | Ki | Gain | TL_Gain | integral gain factor | STATIC_CAL | Int8 | 2^-6 | 0 | 0 | | | | inherited |
| | Ki | Output | TL_Gain | | default | Int32 | 2^-3 | 0 | 0 | | | | inherited |
| ✓ | Kp | Gain | TL_Gain | proportional gain fact... | STATIC_CAL | Int8 | 2^-6 | 0 | 0 | | | | inherited |
| | Kp | Output | TL_Gain | | default | Int32 | 2^-6 | 0 | 0 | | | | inherited |
| ✓ | Unit Delay | Output | TL_UnitDelay | | default | UInt16 | 2^-6 | 0 | 0 | | | | inherited |
| | Unit Delay | State | TL_UnitDelay | | default | UInt16 | 2^-6 | 0 | 0 | * | * | * | inherited |
| ✓ | e | Output | TL_Sum | | default | Int16 | 2^-10 | 0 | 0 | | | | inherited |
| | sU | Output | TL_Sum | this is the controller... | STATIC_DISP | Int16 | 2^-6 | 0 | 0 | | | | inherited |
| | x | Output | TL_Sum | | default | Int16 | 2^-6 | 0 | 0 | | | | inherited |
| | U | Output | TL_Outport | | default | Int16 | 2^-6 | 0 | 0 | | | | inherited |

Fig. 9

| Status | Name (ModelElem.) | VariableName (Mo... | Type (ModelElem.) | VariableKind (Mo... | Description | Class | NameTemplate | Type |
|---|---|---|---|---|---|---|---|---|
| | REF | Output | TL_Inport | Output | | default | $S_$B | UInt16 |
| | Y | Output | TL_Inport | Output | | default | $S_$B | UInt16 |
| | Ki | Gain | TL_Gain | Parameter | integral gain factor | STATIC_CAL | P_$S_$B | Int8 |
| | Ki | Output | TL_Gain | Output | | default | $S_$B | Int16 |
| | Kp | Gain | TL_Gain | Parameter | proportional gain fact... | STATIC_CAL | P_$S_$B | Int8 |
| | Kp | Output | TL_Gain | Output | | default | $S_$B | Int16 |
| | Unit Delay | Output | TL_UnitDelay | Output | | default | $S_$B | UInt16 |
| | Unit Delay | State | TL_UnitDelay | State | | default | X_$S_$B | UInt16 |
| | e | Output | TL_Sum | Output | | default | $S_$B | Int16 |
| | sJ | Output | TL_Sum | Output | this is the controller. | STATIC_DISP | $S_$B | Int16 |
| | x | Output | TL_Sum | Output | | default | $S_$B | Int16 |

Fig. 10

METHOD AND SYSTEM FOR EDITING A BLOCK DIAGRAM MODEL

This nonprovisional application claims priority under 35 U.S.C. § 119(a) to German Patent Application No. 10 2018 106 654.6, which was filed in Germany on Mar. 21, 2018, and which is herein incorporated by reference.

BACKGROUND OF THE INVENTION

Field of the Invention

The present invention relates to a method and a computer system for editing properties of model elements in a block diagram and for automatically generating code from block diagrams, the code being used in, for example, electronic control units.

Description of the Background Art

Electronic control units (ECUs) are ubiquitous especially in automotive applications; generally, they may contain a processor, in particular a microcontroller, one or more sensor interfaces and one or more circuits to control an actuator. Current parameters of a physical process are preferably determined using the signals of the one or more sensors connected to the sensor interfaces. Based on a predefined control strategy, the processor may control the one or more circuits to apply the actuators in order to influence the physical process. For example, an ECU may be used to perform anti-lock braking, with a sensor measuring the wheel velocity and a magnetic valve reducing the pressure in the corresponding wheel brakes.

In order to speed up the development process for ECUs, control strategies are preferably developed using block diagrams in a technical computing environment (TCE), which allows for tracing the temporal behavior of a physical system described by one or more blocks in the block diagram. An advantage of this model-based design of ECU software is in allowing for an easy transition from designing the control strategy to implementing it in program code. The document "Production Quality Code Generation from Simulink Block Diagrams", Proceedings of the 1999 IEEE International Symposium on Computer Aided Control System Design, Kohala-Coast, Hawai'i, USA, by H. Hanselmann et al. describes a system for automatically generating production code based on a block diagram containing one or more blocks that specify the functionality of the program. The program may in particular be a control program for an ECU, the control program implementing the desired control strategy.

The model elements in a block diagram, in particular atomic blocks, generally are assigned a plurality of properties, especially for adapting the automatic code generation. Clicking on a block generally opens a block dialog that allows for modifying any property present in that block. For the user, it is easy to select a model element for editing, and it is easy to determine which properties may be edited, as only those properties that may be edited are displayed in the dialog. Further, because editing is performed directly in the block diagram, the user knows where results of the performed changes will take effect. However, when a particular property needs to be edited for a plurality of model elements, doing so becomes cumbersome as soon as more than two or three elements are involved.

Thus, improved methods for editing properties of model elements in a block diagram are needed; in particular, it would be desirable to allow for comfortably editing a plurality of model elements at once.

SUMMARY OF THE INVENTION

It is therefore an object of the present invention to provide a method and computer system for editing a property of one or more model elements in a block diagram and for automatically generating source code from a block diagram comprising an implementation of the program.

In an exemplary embodiment of the invention, a computer-implemented method for editing one or more properties of one or more model elements in a block diagram of a technical computing environment is provided, wherein model elements comprise blocks and variables in blocks, wherein one or more properties are assigned to each model element, wherein the technical computing environment comprises a model editor, a data definition tool and a code generator. A processor of a host computer running the technical computing environment opens a block diagram in the model editor, displays model elements present in the block diagram, receives a selection of one or more model elements, highlights the selected model elements, receives an edit command for setting a new value for a chosen property of the selected model elements, and sets the chosen property to the new value for each selected model element comprising the chosen property. Displaying a list of model elements comprises displaying one or more properties of the model elements in a table, the table comprising one row/column per variable, so that for a block comprising multiple variables, multiple rows/columns are shown, wherein corresponding properties of different variables are displayed in the same row/column.

The steps of the inventive methods may be carried out by, for example, at least one processor of a host computer running different software components, such as parts of the technical computing environment, the software components preferably using the mechanisms of the technical computing environment or of the operating system of the host computer to exchange data and/or cause the execution of one or more further software components. The host computer may be, for example, a stand-alone computer, or it may comprise one or more servers with a plurality of processing elements, the servers being connected to a client comprising a display device and an input device via a network. Thus, the technical computing environment may be executed partially or completely on a remote server, such as in a cloud computing setup. A graphical user interface of the technical computing environment may be displayed on a portable computing device, for example, a computing device with a touch screen interface. The block diagram may comprise multiple blocks with input and/or output signals that are connected to output and/or input signals of other blocks. Each block may be an atomic functional unit or may be a hierarchical block that is composed of a plurality of subordinate blocks.

The method allows for selectively changing the properties of a plurality of model elements. By displaying the properties in a table, the user may easily obtain an overview. For a block comprising a plurality of variables, a property of the block may be displayed multiple times in order to facilitate uniform editing of properties. Because each variable of a block is displayed in a single row, it is easy to edit all variables in one or more blocks at once. By displaying corresponding properties of different variables in a single column, choosing a property for editing is simplified; it may include nothing more than selecting the column. Alternatively, one column can be displayed per variable, and a property can be displayed in the same row for multiple variables. When the list of selected model elements comprises a model element that does not possess the chosen property, no value is set, but no disturbing error messages are emitted. This is especially useful when the user wants to set more than one property, because in that case, they simply can select all model elements comprising one of the properties, and the respective value is only set for those model elements to which the property pertains. Thus, the inventive method allows for a more comfortable editing of a plurality of model elements.

Model elements can comprise atomic blocks, such as a simple operation, and hierarchical blocks, such as a subsystem. The model containing the blocks may be a time-dependent block diagram adapted to trace the evolution of the modeled system over a given period of time. Alternatively or additionally, the model may comprise a state-based block diagram (that may also be called state chart), in which the blocks correspond to states between which the system changes based on the fulfillment of transition conditions. For example, relations may be defined between model elements and properties. Each block may possess a number of properties that for instance determine its appearance in the code; there is a 1:n relation between a block and associated properties. A block may be associated to one or more variables that can be considered dependent model elements. Variables may be defined directly inside a block or indirectly by signals exchanged between blocks. Preferably, a hierarchy is defined where each variable is assigned to a block, but may comprise multiple properties. Each variable may possess a number of properties that for instance determine the generated code; there is a 1:m relation between a variable and associated properties. Properties may pertain to code generation, e.g. defining a data type for a variable or assigning a name to the variable. The term properties generally is not limited to code generation properties, but may comprise any property in a model element that can be set separately. There may exist an interdependency between different properties, so that a particular value for a first property limits the possible values for a related property. For example, a range of possible values for a variable may determine possible data types of the variable in the generated code; the code generated for a specific block may also differ dependent on a data type of a variable.

The user interface for editing a plurality of model elements preferably focuses on a view emphasizing variables, because variables generally possess a plurality of properties that directly influence the generated code and are more likely to be edited by a user. The user interface is based on an underlying data model with a view adapted to user expectations.

One or more properties of one or more selected model elements can be marked as read-only, and a new value is not set, but discarded, for those model elements in which the chosen property is marked as read-only. This allows for finely adapting the editing of properties. Because no error messages pop up, but a read-only property is simply left at the initial value, this is less distracting for a user.

The method also comprises an additional step of validating the new value for the edited property based on at least one predefined validation rule, wherein a visual indication is displayed in connection with a property violating a validation rule. As a result, the user may easily see where a property may need to be looked at more closely. Alternatively, obviously wrong values for a property may not be set, but may be ignored, when the initial validation determines that they do not comply with at least one validation rule. A validation rule may comprise a simple condition, e.g. the value of a property needs to be a string with one to ten characters. Further, a validation rule may comprise conditions relating different properties; when a value range for a variable is given, the minimum value (min) needs to be smaller than or equal to the maximum value (max).

Setting the new value can comprise saving the new value in a local data storage, for example, an in-memory data storage comprising objects assigned to properties, and applying the property value from the local data storage to the opened block diagram. By using a local in-memory data storage, viewing values of the properties and verifying the compliance with validation rules can be performed instantly. A user may choose to either immediately synchronize properties with the opened model or defer synchronization until receiving a trigger. The synchronization trigger may be based on fulfillment of a condition and/or it may be directly assigned to an element of a graphical user interface. For instance, a command to generate production code may be defined as a synchronization trigger.

A selection of a view set can be received, whereby the view set comprises a definition of one or more columns/rows to display, wherein the definition comprises the order in which to display properties. View sets allow for customizing the order of displaying different properties and for varying the properties to be displayed at all. For example, view sets may be edited by changing the order of rows as well as adding or removing rows; saving an edited view set allows for easily reproducing a particular view.

A property can be selected and the model elements to be displayed can be filtered based on the value of the selected property and/or changing the column in which to display the model element based on the value of the selected property. Modell elements, for example, variables, may be filtered and ordered based on one or more properties.

The table can comprise an additional column/row, wherein each cell of the additional column/row comprises a user interface element, such as a checkbox, for selecting model elements. This is a particularly comfortable mechanism for selection; the row/column (i.e. the corresponding model element/variable) can be selected by simply clicking a checkbox or an equivalent user interface element) in this additional column/row. For example, selected rows/columns can also be highlighted by assigning them a predefined color in the table. Editing a chosen property will only affect the selected model elements. Properties of a block can be edited by selecting a variable in the block.

The method can further comprise: receiving a request to generate code, retrieving additional property information from the data definition tool, generating production code based on the opened block diagram, and saving additional information in the data definition tool, the additional information comprising information on the at least one production code file generated. A variable in the model may reference a variable definition or a variable class definition in the data definition tool. The additional property information may be referenced by one or more properties of the one or more model elements.

The model elements can be displayed in a tree view, the tree view allowing for navigating the model. This tree view may e.g. be displayed left of the table or in a separate window. For example, when a subsystem is chosen in the tree view, the table can be adapted accordingly, so that only the blocks (and variables) present in this subsystem are displayed in the table.

An aspect of the invention also concerns a non-transitory computer readable medium containing instructions that, when executed by a microprocessor of a computer system, cause the computer system to carry out the inventive method as described above or in the appended claims.

A computer system is also provided which comprises a processor, a random access memory, a graphics controller connected to a display, a serial interface connected to at least one human input device, and a nonvolatile memory, for example, a hard disk or a solid-state disk. The nonvolatile memory comprises instructions that, when executed by the processor, cause the computer system to carry out the inventive method.

The processor may be a general-purpose microprocessor that is customary used as the central processing unit of a personal computer or it may comprise one or a plurality of processing elements adapted for carrying out specific calculations, such as a graphics-processing unit. The processor may be replaced or complemented by a programmable logic device, such as a field-programmable gate array, which is configured to provide a defined set of operations and/or may comprise an IP core microprocessor.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 8 is a table comprising exemplary properties of model elements in a block diagram;

FIG. 9 is a table comprising exemplary properties of model elements in a block diagram, where different variables have selected and a chosen property has been edited; and FIG. 10 is a table comprising exemplary properties of model elements in a block diagram after having changed the view set

DETAILED DESCRIPTION

Figure 1:
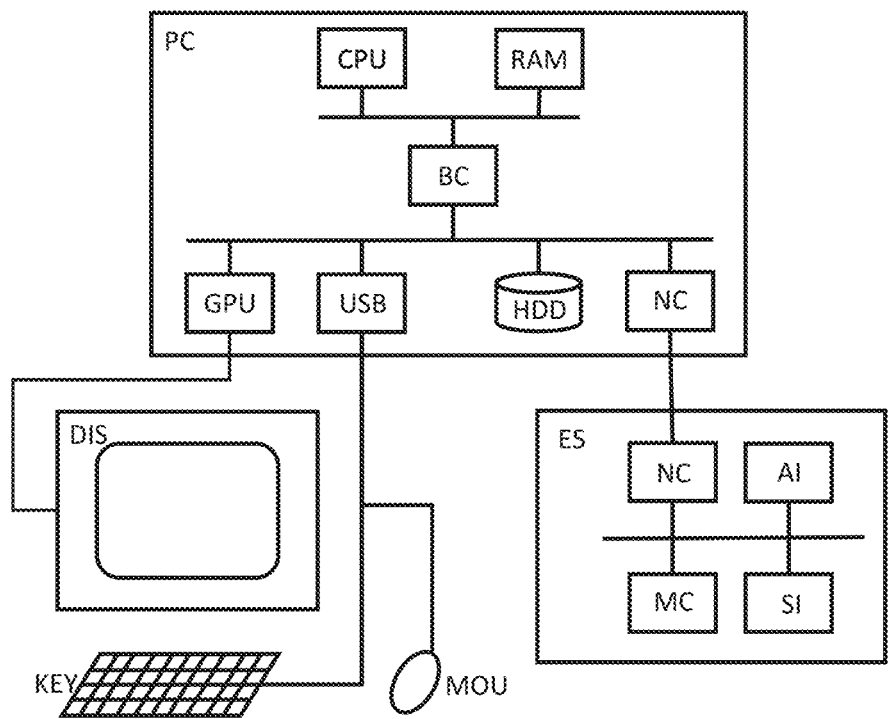
FIG. 1 is an exemplary diagram of a computer system.

FIG. 1 illustrates an exemplary embodiment of a computer system.

The shown embodiment comprises a host computer PC with a display DIS and human interface devices such as a keyboard KEY and a mouse MOU; further, an embedded system ES is depicted, which may e.g. be used for a processor-in-the-loop simulation.

The host computer PC comprises at least one processor CPU with one or multiple cores, a random access memory RAM and a number of devices connected to a local bus (such as PCI Express), which exchanges data with the CPU via a bus controller BC. The devices comprise e.g. a graphics-processing unit GPU for driving the display, a controller USB for attaching peripherals, a non-volatile memory HDD such as a hard disk or a solid-state disk, and a network interface NC. Preferably, the non-volatile memory comprises instructions that, when executed by one or more cores of the processor CPU, cause the computer system to carry out a method according to one of the claims.

The embedded system ES comprises a network interface NC, an actuator interface AI and a sensor interface SI as well as a microcontroller MC. As an alternative or addition to the microcontroller MC, the embedded system ES may comprise a programmable logic device such as a field-programmable gate array. The programmable logic device may contain a hardwired digital signal processor and it may be configured to comprise an IP core microprocessor. Preferably, the embedded system ES is connected to the personal computer PC via the network interface NC, which may e.g. be of USB, RS-232 or Ethernet type. The embedded system may comprise a non-volatile memory that comprises instructions to be carried out by the microcontroller or a configuration to be loaded on the programmable logic device.

In an embodiment of the invention, the host computer may comprise one or more servers comprising one or more processing elements, the servers being connected to a client comprising a display device and an input device via a network. Thus, the technical computing environment may be executed partially or completely on a remote server, such as in a cloud computing setup. A personal computer may be used as a client comprising a display device and an input device via a network. Alternatively, a graphical user interface of the technical computing environment may be displayed on a portable computing device, for example, a portable computing device with a touch screen interface or a virtual reality device.

In an embodiment of the invention, the computer system may not comprise an embedded system ES. While the embedded system ES is useful for carrying out a processor-in-the-loop simulation of a control program, the presence of an embedded system is not necessary for carrying out at least some aspects of the present invention.

Figure 2:
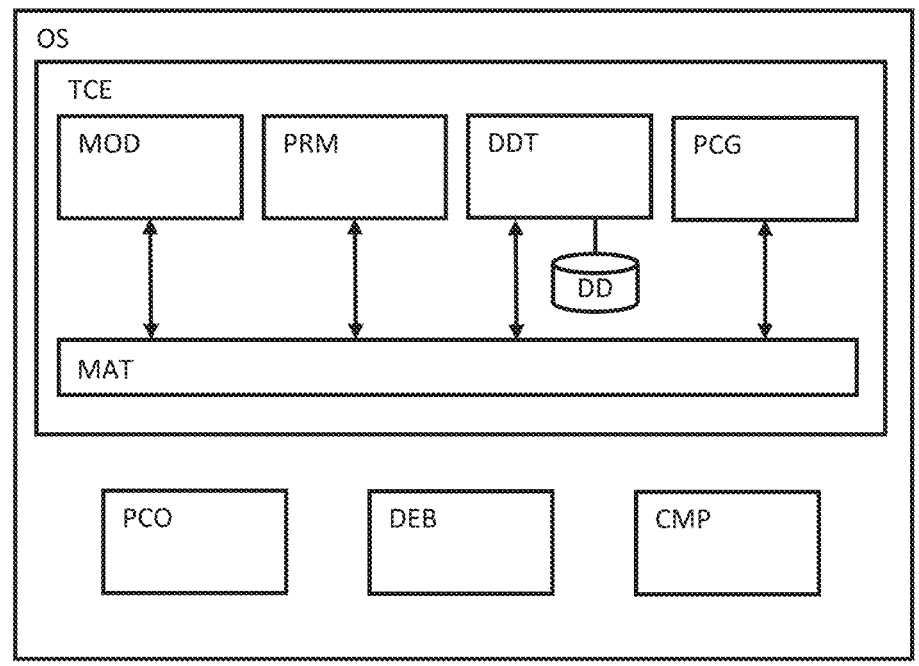
FIG. 2 is an exemplary diagram of software components in a computer system.

FIG. 2 displays an exemplary embodiment of the software components being executed on a computer system, which may be realized as a host computer PC with a standard microprocessor that runs a standard operating system OS such as Microsoft Windows or a Linux distribution.

On the host computer PC, a technical computing environment TCE such as MATLAB/Simulink of The MathWorks may be installed. Other examples of technical computing environments comprise LabVIEW of National Instruments or ASCET of ETAS. The technical computing environment TCE comprises a plurality of software components such as a model editor MOD and a script interpreter MAT that is adapted for carrying out calculations or modifying data. The TCE further comprises a production code generator PCG adapted to produce production code from a model, a property manager PRM adapted to edit properties of model elements and a data definition tool DDT. The expression that a software component is comprised in the TCE is intended to encompass the case that the software component uses a specific mechanism of the TCE such as an application-programming interface of the TCE in order to exchange data and/or instructions with other software components in the TCE. Particularly the script interpreter MAT may provide mechanisms for calling other software components and for exchanging data between software components, as indicated by double-sided arrows in the figure. Other mechanisms may also be used; for example, a software component may be realized as or comprise an add-on such as a toolbox for the model editor.

The model editor MOD may provide a graphical user interface for creating and modifying block diagrams that preferably describe the temporal behavior of a dynamic system. Additionally, blocks adapted for describing finite states and conditions for transitions between states may be used to model the dynamic system. A block may describe an atomic operation, such as an arithmetic calculation or a logic expression, or it may represent a subsystem that is described in more detail by an additional or partial block diagram in a subordinate hierarchical level. This need not imply that the partial block diagram is stored in a separate file, but rather that the functionality of a hierarchical block is defined by a plurality of blocks in a subordinate level. Alternatively, it may contain code in a higher-level programming language, for example, a dynamic language intended for mathematical programming, that realizes the block's functionality. Multiple blocks may be connected by signals for the exchange of data. For example, an initial block may receive a signal of type single as input signal, may modify the signal e.g. by adding a constant and may send an output signal of type double to a further block. It may be said that the further block is downstream of the initial block because they are connected by a signal path so that data flows from the initial block to the further block.

The TCE may comprise a simulation engine being adapted to execute a block diagram created in the model editor MOD in order to observe the temporal behavior of the dynamic system described by the block diagram. The execution of a block diagram may also be called a model-in-the-loop simulation of the dynamic system and is preferably carried out using high-precision operations in order to observe the behavior more closely and to create reference data.

The production code generator PCG allows for creating production code from one or more blocks in a block diagram. Production code may be optimized for readability, traceability, safety, low-energy consumption, execution speed and/or memory requirements. Preferably, the code generator provides a user interface for setting a plurality of options for adapting the customization of the generated code. Customization options may include target-specific optimizations for the microcontroller of the embedded system and enforcing compliance of the generated code to a specific standard, such as the MISRA C guidelines. An exemplary production code generator PCG is TargetLink of dSPACE.

The property manager PRM is adapted to edit the properties of one or more model elements; for example, a chosen property of multiple selected model elements may be edited in a single step. Preferably, the property manager PRM comprises a local in-memory data storage for storing the properties of different model elements in a currently opened block diagram. This allows for deferring synchronization with the script interpreter MAT and/or the model editor MOD. Generally, violation of a fixed constraint or a dependency validation may result in a warning but need not hinder applying the values to the model. For circular or linear dependencies between different model elements, the local in-memory data storage allows to keep user input intact even when intermediate versions of the property set in a complex edit operation do not comply with one or more validation rules. Thus, deadlocks in complex edit operations are mitigated. For a limited set of hard validation rules, any value violating a hard validation rule may not be applied to the model. This may be used to ensure that the model (the block diagram) can still be executed.

The data definition tool DDT provides a local or remote database DD for storing definitions and parameters as well as an application-programming interface for automatic exchange of the data between different software components. The term "database" is to be understood preferably in a broad sense, so that a file with a tree structure may be considered a database. A data definition tool allows for a clean separation of the model of the dynamic system given in the block diagram from implementation-specific details stored in the database. When a complex model is structured in different sub-models, data in different sub-models may be linked. By storing corresponding information in the data definition tool, these dependencies may be automatically resolved. Additionally, by exchanging data with a software architecture tool, such as SystemDesk of dSPACE, the data definition tool DDT can be used as part of a higher-level tool chain, for example, to generate product code compliant to the AUTOSAR standard. A preferred data definition tool is TargetLink Data Dictionary of dSPACE. Properties or other information from the data definition tool may be taken into account for one or more validation rules.

Other software components such as a production code compiler PCO, a debugger DEB or a comparison tool CMP may also be installed on the computer. These software components may be interfaced to each other and/or the technical computing environment using standard mechanisms of the underlying operating system OS. The compiler PCO may generate an executable for the microprocessor of the PC or it may generate an object code for the microcontroller of the embedded system. Additionally, it may be configured to generate additional debugging information and to include it in the executable. In this way, the debugger DEB can e.g. be used for observing the value of a signal during a software-in-the-loop simulation of the generated production code. Depending on the intended use, the observed values may be directly displayed to the user and/or they may be logged in a memory, e.g. in RAM, in a file or a database.

Figure 3:
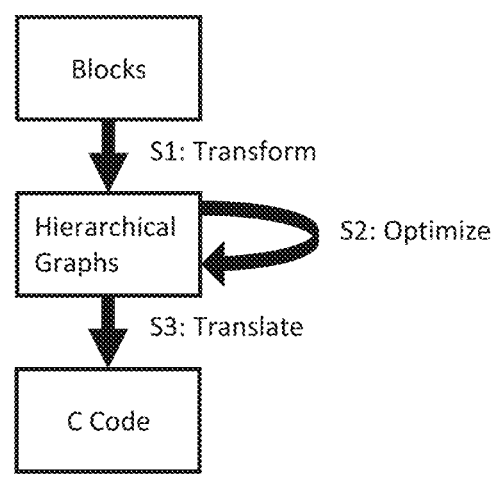
FIG. 3 is an exemplary diagram of a method for generating production code from a block diagram.

FIG. 3 illustrates an exemplary embodiment of the generation of production code from one or more blocks in a block diagram. The following steps are preferably carried out by a microprocessor on the host computer; alternatively, a client server setup may be used so that computationally expensive steps are carried on a remote server containing a plurality of microprocessors.

In a first step S1, the selected one or more blocks (or, if selected, the entire block diagram) and related input data are transformed to an intermediate representation such as one or more hierarchical graphs. These hierarchical graphs may comprise a data flow graph, a control flow graph and/or a tree structure. Related input data may e.g. be extracted from a database associated with the block diagram. This may encompass situations where elements of the block diagram are created based on information from a data definition tool, or where settings relevant for the production code generation are retrieved from the data definition tool.

In a second step S2, the hierarchical graphs are optimized in order to reduce the number of variables required and/or the number of operations or instructions to be carried out. This optimization may comprise a plurality of intermediate steps on further intermediate representations between block level and production code level. In each step, an initial set of hierarchical graphs or an intermediate language is converted to a modified set of hierarchical graphs or an intermediate language while applying one or more optimization rules. A number of strategies such as constant folding or elimination of dead code may be applied during optimization.

In a third step S3, the optimized intermediate representations such as optimized hierarchical graphs are translated to code in a high-level or low-level programming language, preferably C code. The code may be further optimized in this step and restricted to a subset of the linear or parallel programming language, the control and dataflow structures may be restricted to precisely specified variants, the scope of functions and data may be restricted according to accurately specified rules. Alternatively or in addition, additional information may be added to the code, e.g. in the form of comments, to enhance readability or help in debugging the code.

During or after the code generation, information on the current block diagram or the code generation, especially results of the code generation, may again be stored in a database such as the data definition tool. This information may e.g. be used to initialize the simulation engine, to influence a compilation process with a production code compiler, or to export production code information for use in other tools/process, like e.g. calibration and measurement information in ASAP2 format (for example a variable description file) or AUTOSAR XML information. Preferably, a documentation is generated automatically after production code generation has been finished.

In alternative embodiments, hardware-level code or a configuration for a programmable hardware device may be created from the blocks describing the control program.

Figure 4:
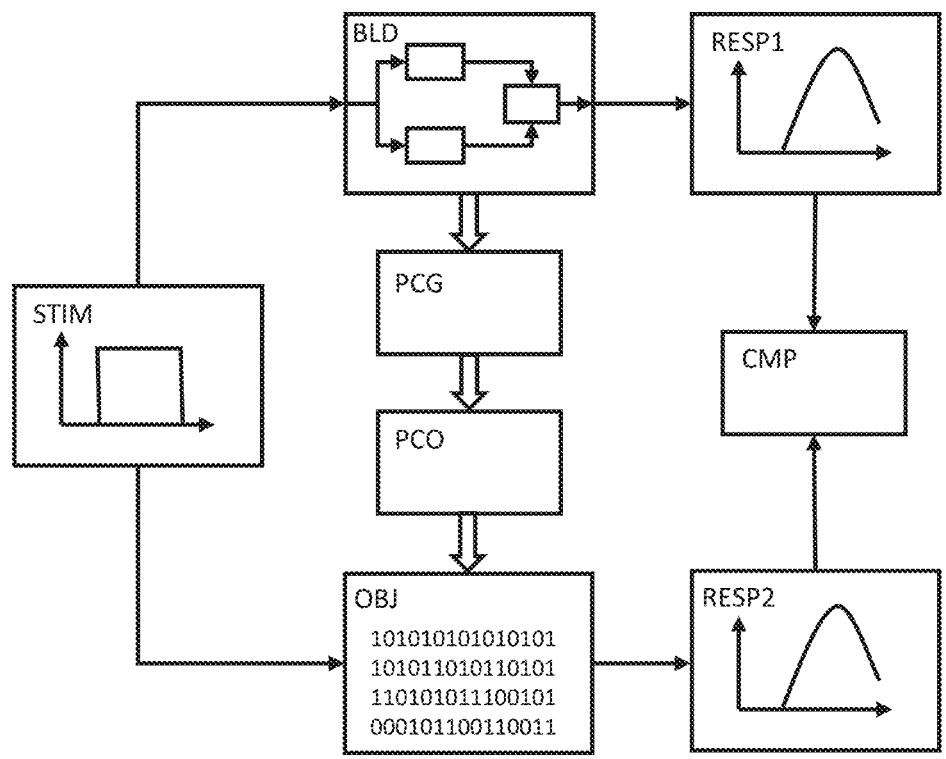
FIG. 4 is an exemplary diagram of a method for testing the compliance of the executable with a model specifying the desired behavior.

FIG. 4 displays an exemplary embodiment of a method for compiling and testing a control program.

The model editor MOD of the TCE preferably comprises a graphical user interface for modifying a block diagram BLD, which may comprise a plurality of blocks interconnected by signal paths. Each block may be an atomic block providing a specific functionality or it may represent a hierarchical block such as a subsystem, which comprise a plurality of subordinate blocks that are shown in a lower hierarchical level. Blocks may be connected by signals which may be of scalar or composite type and which can be represented by arrows indication the direction of the data flow. In the shown example, the block diagram comprises three blocks, an input port for receiving an input signal and an output port for sending an output signal. Preferably, the block diagram describes the predetermined or intended behavior of a control program. Upon activation of the simulation engine in the technical computing environment, the block diagram BLD is executed and results are calculated for each time step. The block diagram may be interpreted directly or it may be converted to an intermediate form that allows for a faster execution in the simulation engine.

Preferably, a number of test cases for the control program have been deduced from the specification and intended application of the control program. Advantageously, a test case comprises a stimulus STIM sent as an input signal to the control program and a corresponding response RESP received as an output signal from the control program. In the shown example, the stimulus STIM is represented by a diagram depicted a particular temporal behavior of the input signal. When the control program is executed in the simulation engine on the host computer, operations corresponding to the block diagram BLD are carried out for a plurality of time steps. During each time step, the current value of the stimulus STIM is fed to the appropriate input ports of the block diagram, the block diagram BLD is being executed in the simulation engine, so that signals are being manipulated and a new internal state of the model may be reached. By simulating the model given in the block diagram for a predetermined duration and by recording the output signal, a response RESP1 can be determined in a model-in-the-loop simulation. A model-in-the-loop simulation mode may be used for verifying that the block diagram executed in the simulation engine actually describes the intended behavior of the control program. All arithmetic calculations can be carried out with high-precision operations, e.g. using the floating-point data type double for the variables. As a result, the simulation is sufficiently accurate to use the recorded output signals as reference data.

Once correctness of the model has been established and reference data has been stored, the blocks corresponding to the control program are preferably converted to program code via the production code generator PCG. The generated production code is then compiled to object code or an executable using the production code compiler PCO; an object code is binary data that contains instructions for a particular processor. When the object code is combined with additional information for the operating system of the host computer, an executable for the host computer is formed. Settings applied during the code generation may comprise a conversion to lower-precision operations that are computationally more efficient, e.g. integer instructions for fixed-point calculations, so that the control program later can be executed in real-time on the microcontroller of an embedded system.

In order to verify that the calculations of the generated code are sufficiently accurate and match the behavior of the blocks in the graphical model, a software-in-the-loop simulation or a processor-in-the-loop simulation may be carried out. The object code or the executable OBJ, which may be in the form of a DLL, contains calculations corresponding to the block diagram. During a predetermined duration, a stimulus STIM is fed to the object code or executable OBJ, and the output signals are recorded to obtain a response RESP2. Generally, multiple variables may be logged while running the simulation; this may comprise adding log macros to the program code prior to the simulation and determine a basic data type of an enumeration signal when initializing the simulation.

The response RESP1 of the model-in-the-loop simulation may be displayed on the host computer simultaneously with the response RESP2 of the generated code, so that a visual comparison may be performed by the user. Additionally or alternatively, the response RESP1 and RESP2 may be compared in a comparison tool CMP, so that a number of checks for compliance to predetermined conditions may be carried out. Preferably, the output signals are compared point by point; for example, the absolute difference between a data point in RESP1 and the corresponding data point in RESP2 may be calculated. By comparing the differences to a threshold indicating a maximum permissible difference, the correctness of the optimizations applied when generating and compiling the code can be verified.

Figure 5:
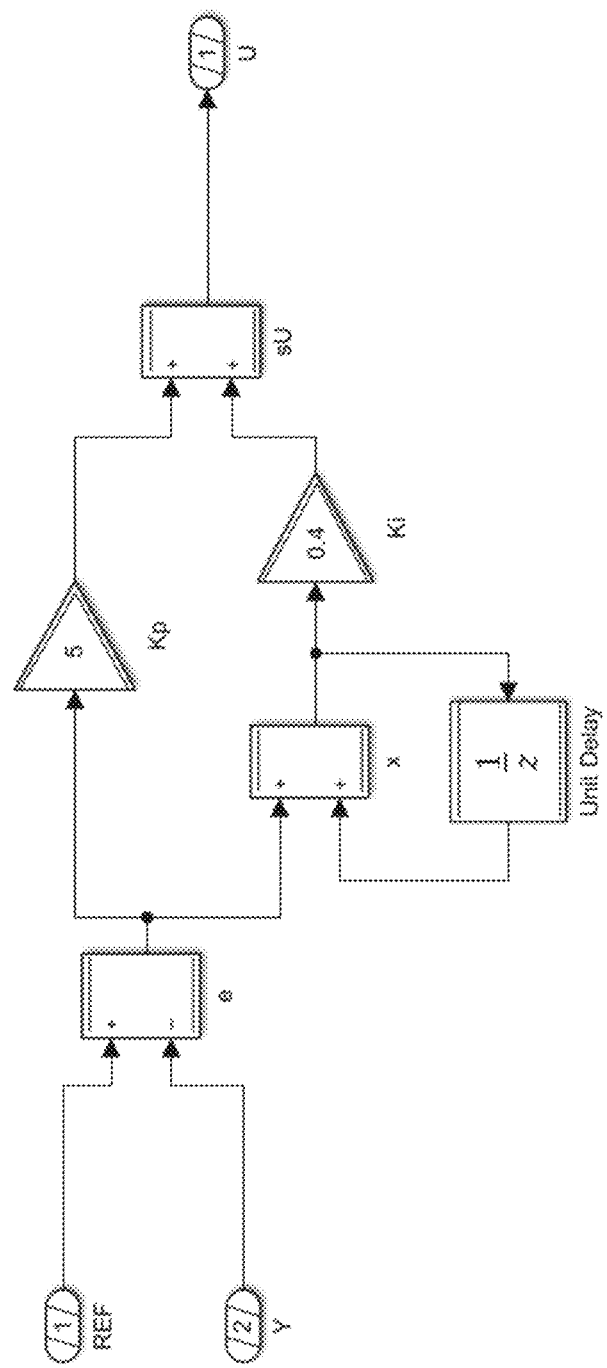
FIG. 5 is an exemplary embodiment of a block diagram.

FIG. 5 illustrates an exemplary embodiment of a block diagram comprising a controller model.

A first input port REF and a second input port Y receive input signals; they are connected to a difference block e calculating the error signal. The output of the difference block e is connected to a gain block Kp, the gain block Kp multiplying the signal by a factor of 5, and a first input of summation block x. In a delayed feedback loop, the output of summation block x is connected to a Unit Delay block for delaying the signal, the output of which is connected to a second input of summation block. The output signal of summation block x is connected to a gain block Ki, the gain block Ki multiplying the signal by a factor of 0.4. The output signals of gain blocks Kp and Ki are connected to a further summation block sU. The summation block sU adds both signals and is connected to output port U.

Figure 6:
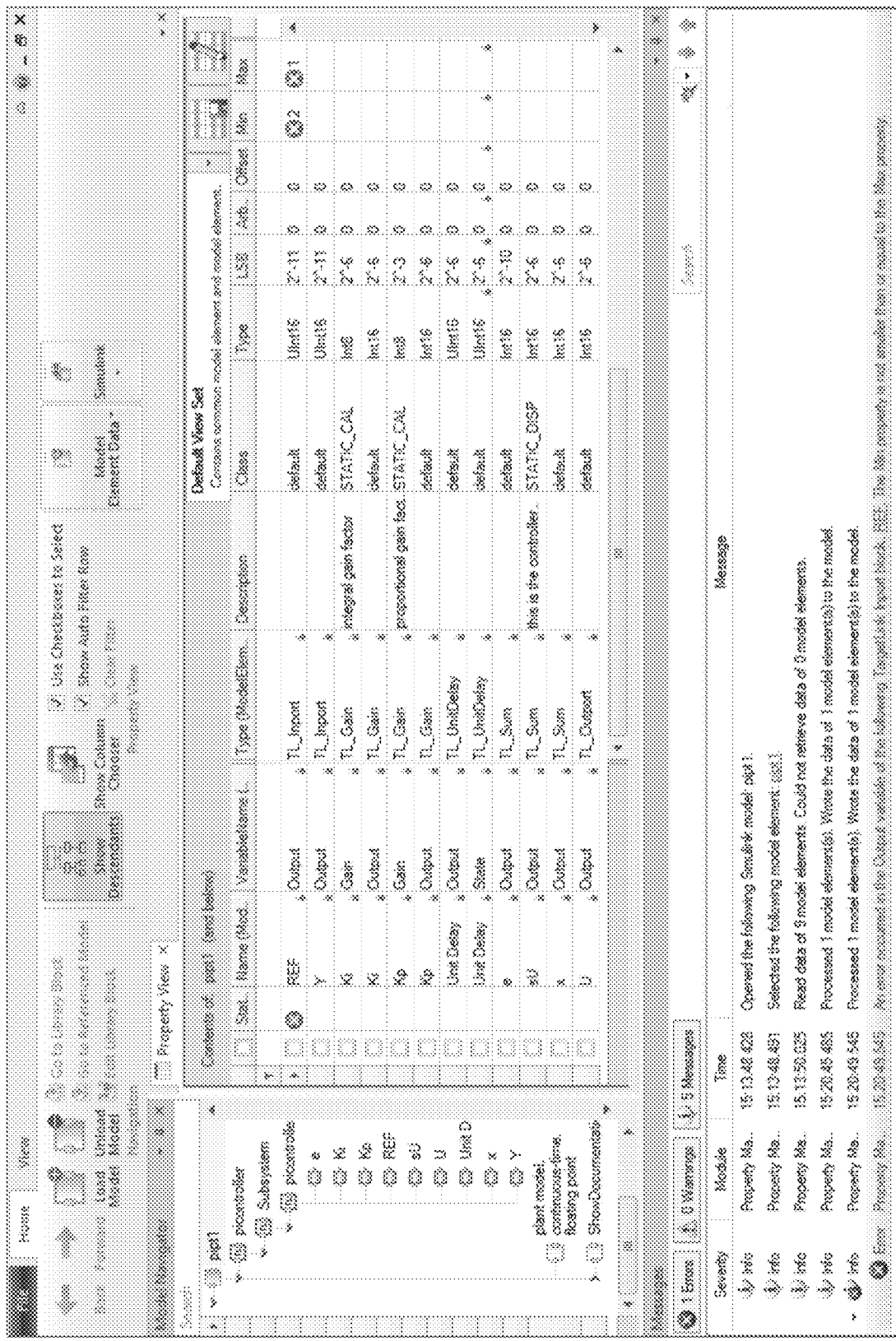
FIG. 6 is an exemplary embodiment of a graphical user interface for editing properties of model elements in a block diagram.

FIG. 6 displays an exemplary embodiment of a graphical user interface for editing properties of model elements in a block diagram, the graphical user interface having multiple areas.

On top, a menu bar is shown with a plurality of icons that may be clicked by the user for performing different actions on the model or for adjusting the behavior of the user interface; the menu bar may comprise multiple ribbons. On the left side, a Model Navigator area is displayed that comprises a tree view of the model elements; hierarchical blocks are shown as branches of the tree view, whereas subordinate model elements are shown as leaves. The user may navigate the model by selecting one or more model elements to be displayed. The central area of the graphical user interface contains a Property View; in a table, properties of the selected model elements are shown. At the bottom, a Messages window displays errors, warnings and other messages pertaining to viewing or editing the opened model.

The Property View area displays a table with each column corresponding to a variable in one of the selected model elements and each row corresponding to a property of the model element or the variable in the model element. The table comprises two additional rows, a first row with check boxes for selecting one or more variables, and a second row displaying status information for the variable in the respective column. The table may be adapted to sort or filter the shown variables, when the user selects a row and inputs a filter criterion or a sort order for the row. Further, the table may be adapted by adding rows to be shown, removing rows from view and changing the order of displayed rows; a particular view may be stored as a view set, so that a user can comfortably change the view as desired and return to a preview arrangement by loading a view set.

In the Property View area of FIG. 6, the variables of the blocks in the controller model from FIG. 5 are shown. The first input port REF, a model element of type TL_Inport, comprises a variable of name Output. Several properties of the variable may pertain to code generation. This variable has been assigned the class default and a data type of UInt16, i.e. an unsigned integer of 16-bit width. The second input port Y (type TL_Inport) also comprises a variable of name Output with a data type of UInt16. Fixed-point variables may be assigned a scaling; for the Output variable of the block REF, a least significant bit (LSB) corresponds to a value of $2^{-11}$. Additionally, a minimum (Min) and/or maximum (Max) value may be assigned to a variable; the Output variable of REF has manually been assigned a Min value of 2 and a Max value of 1.

The graphical user interface may comprise the verification of validation rules for one or more rows of the different variables as well as displaying an indication when a verification rule is not met. For instance, a validation rule may state that the minimum value of a variable has to be smaller than or equal to the maximum value of this variable. In the case of the Output variable of the REF block, this condition is not fulfilled; to indicate the validation error, a circle with an X inside is shown in the status row of the affected variable as well as the rows containing the properties that do not comply with the validation rule.

The gain block Ki (type TL_Gain) comprises two variables named Gain and Output. The first variable Gain is a block parameter that indicates the factor by which to multiply an input signal; it has been assigned the class STATIC_CAL and the data type Int8. The second variable Output has been assigned the class default and the data type Int16. Similarly, the gain block Kp (type TL_Gain) also comprises two variables named Gain and Output, of which Gain is a block parameter. The Unit Delay block of type TL_UnitDelay comprises two variables named Output and State that have both been assigned the class default and the data type UInt16.

The difference block e is of type TL_Sum and comprises a variable named Output that has been assigned the class default and the data type Int16. The summation block sU is of type TL_Sum and comprises a variable named Output that has been assigned the class STATIC_DISP and the data type Int16. As indicated by the common type, a difference block and a summation block can be derived from one model element with an additional property indicating whether to subtract the second input signal from the first input signal or whether to add both input signals. In principle, a user may view this property by editing the rows to be displayed in the table. A further summation block x (type TL_Sum) and an output port U (type TL_Outport) each contain one variable named Output that has been assigned the class default and the data type Int16.

Figure 7:
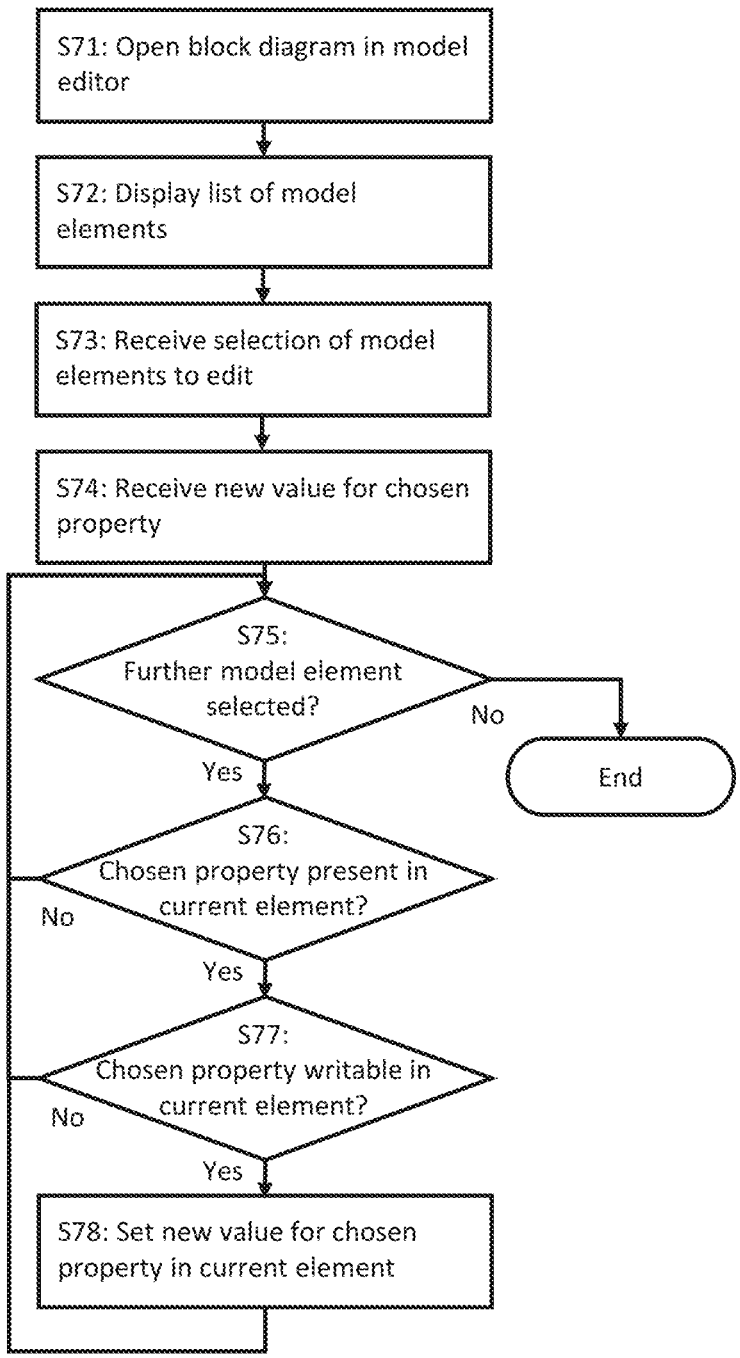
FIG. 7 is a schematic diagram of a method for editing properties of model elements according to the invention.

FIG. 7 shows a schematic diagram of a method for editing properties of model elements according to the invention. The method can be carried out by one or more processors of a host computer setup; for simplicity, a single processor on a host computer running all the software components is assumed.

In step S71 (Open block diagram in model editor), the processor opens a block diagram in the model editor MOD. The model editor need not be visible on the display of the host computer in order to be able to edit properties of the model elements.

A list of the model elements in the block diagram is shown in step S72 (Display list model elements). The model elements are shown in a table so that each variable of a model element is displayed in a separate column, as discussed in connection with FIG. 6. Additionally, a tree view for navigating the block diagram may be shown to the user.

In step S73 (Receive selection of model elements to edit), the processor receives a selection of one or more model elements that are to be edited. Preferably, one or more variables are selected in the table displaying variables in separate columns.

The user may choose a property and input a new value for the chosen property; for instance, an additional edit field may be shown in the graphical user interface. In step S74 (Receive new value for chosen property), the processor receives the new value for the chosen property. The user may want to apply the new value to many model elements at once.

In step S75 (Further model elements selected) the processor determines if at least one further model element exists that has been selected, but to which the new value has not yet been applied. If no further elements exist, the method ends.

If at least one model element remains to be edited, the processor verifies in step S76 (Chosen property present in current element) if the current model element possesses the chosen property. Model elements of different types may be assigned different properties. Depending on the chosen property, it may be present in all model elements or only in specific model elements. When the chosen property is not present in the current model element, the processor returns to step S75 and determines if a further model element is still present that is to be processed as current model element.

In step S77 (Chosen property writable in current element?), the processor determines if the chosen property is writable in the current model element or if it is read-only. An interaction between different properties may exist in that when a first property has been assigned a particular value, a second property may no longer be writable. Such an interdependence, where the value for the second property is fixed based on the value of the first property, may e.g. be indicated by a lock symbol in a graphical user interface. In case of a read-only property, the processor returns to step S75 and determines if a further model element remains that is to be processed as current model element.

After determining that the preconditions are fulfilled, the processor sets the chosen property in the current model element to the new value in step S78 (Set new value for chosen property in current element). The processor returns to step S75 in order to determine if further model elements need to be processed.

FIG. 8 displays a table comprising exemplary properties of model elements in a block diagram (cf. the Property View area in FIG. 6). In addition to the properties already discussed, this table comprises a row for the Width of a variable in the model element. A width of 1 indicates a scalar variable whereas arrays or busses may be assigned a value depending on the number of components. The input ports REF and Y receive a scalar signal, so that their Output variable has been assigned a width of 1. The remaining model elements each receive an input signal from a further model element upstream of them (such as the input ports). As a result, the width of their variables is read-only; the value for width is inherited depending on the properties of the input signal received by the respective model element.

FIG. 9 displays a table comprising exemplary properties of model elements in a block diagram (cf. the Property View area in FIG. 6). The values for the properties initially corresponded to those in FIG. 8. In the first row, the Output variable of the gain block Ki, the Output variable of the gain block Kp and the State variable of the Unit delay block have been selected. The property Type has been chosen for editing, and a new value of Int32 has been entered. After carrying out the inventive method, the properties are as shown: Both Output variables have been set to Int32; however, the Type of the State variable of the Unit delay block remains UInt16. This property may not be edited because it needs to be the same as that of the Output variable of the Unit Delay block (that had not been selected). By taking into account when a property of a model element is read-only, the inventive method allows for comfortably editing a plurality of model elements. The user is not annoyed by unnecessary error messages and does not need to change the list of selected elements.

FIG. 10 is a table comprising exemplary properties of model elements in a block diagram after having changed the view set. In addition to the properties already discussed, a NameTemplate is shown for each variable, i.e. a rule for automatically determining the name for the variable in generated code, such as based on the block and the subsystem comprising the block. A user may switch between the view of FIG. 10 and the view of FIG. 8 by simply loading a first view set or a second view set.

Those skilled in the art will appreciate that the order of at least some of the steps of the inventive method may be changed without departing from the scope of the claimed invention. While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method for editing one or more properties of one or more model elements in block diagram in a technical computing environment, wherein model elements comprise blocks and variables in blocks, wherein one or more properties are assigned to each model element, wherein the technical computing environment comprises a model editor, a data definition tool and a production code generator, the method being executed by at least one processor of a host computer, the method comprising:

opening a block diagram in the model editor;
displaying model elements present in the block diagram, wherein displaying model elements comprises displaying one or more properties of the model elements in a table, the table comprising one row/column per variable, so that for a block comprising multiple variables, multiple rows/columns are shown, wherein corresponding properties of different variables are displayed in the same column/row;
receiving a selection of one or more model elements;
highlighting the selected model elements in the table;
receiving an edit command for setting a new value for a chosen property of the selected model elements;
validating the new value for the edited property based on at least one predefined validation rule, wherein a visual indication is displayed in connection with a property violating a validation rule;
setting the chosen property to the new value for each selected model element comprising the chosen property; and
using the production code generator for automatically generating source code from each of the selected model elements to implement a software program.

2. The method of claim 1, wherein one or more properties of one or more selected model elements are marked as read-only, and wherein the new value is discarded for those model elements in which the chosen property is marked as read-only.

3. The method of claim 1, wherein setting the new value comprises saving the new value in a local data storage and applying the new value from the local data storage to the opened block diagram.

4. The method of claim 1, further comprising receiving a selection of a view set, the view set comprising a definition of one or more columns/rows to display, wherein the definition comprises the order in which to display properties.

5. The method of claim 1, further comprising selecting a property and filtering the model elements to be displayed based on the value of the selected property and/or changing the column in which to display the model element based on the value of the selected property.

6. The method of claim 1, wherein the table comprises an additional column/row, and wherein each cell of the additional column/row comprises a user interface element for selecting model elements.

7. The method of claim 1, further comprising the steps of:
receiving a request to generate code;
retrieving additional property information from the data definition tool;
generating production code based on the opened block diagram; and
saving additional information in the data definition tool, the additional information comprising information on the at least one production code file generated.

8. The method of claim 1, wherein the model elements are displayed in a tree view, the tree view allowing for navigating the model.

9. A non-transitory computer readable medium containing instructions that, when executed by a microprocessor of a computer system, causes the computer system to carry out the method according to claim 1.

10. A computer system comprising:
a host computer comprising a microprocessor, a random access
memory, a graphics controller connected to a display, a serial interface connected to at least one human input device, and a nonvolatile memory or a hard disk or solid state disk,
wherein the nonvolatile memory comprises instructions that, when executed by the microprocessor, causes the computer system to carry out the method according to claim 1.

11. The computer system of claim 10, further comprising an embedded system connected to the host computer, the embedded system comprising a target processor.

12. A method for editing a property of a model element in a block diagram in a technical computing environment, wherein the model element comprises blocks and variables in blocks, wherein the property is assigned to the model element, wherein the technical computing environment comprises a model editor, a data definition tool and a production code generator, the method being executed by a processor of a host computer, the method comprising:
opening a block diagram in the model editor;
displaying the model element present in the block diagram, said displaying comprising displaying the property of the model element in a table, the table comprising one row or column per variable, so that for a block comprising multiple variables, multiple rows or columns are shown, wherein corresponding properties of different variables are displayed in a same column or row;
highlighting the model element in the table;
receiving an edit command for setting a new value for a chosen property of the model element;
validating the new value for the edited property based on at least one predefined validation rule, wherein a visual indication is displayed in connection with a property violating a validation rule;
setting the chosen property to the new value for the model element except for those properties of the model element that are marked as read-only wherein the new value is discarded; and
using the production code generator for automatically generating source code from the model element to implement a software program.

13. The method of claim 12, wherein setting the new value comprises saving the new value in a local data storage and applying the new value from the local data storage to the opened block diagram.

14. The method of claim 12, further comprising receiving a selection of a view set, the view set comprising a definition of the column or row to display,
wherein the definition comprises an order in which to display properties of the view set.

15. The method of claim 12, further comprising selecting a property and filtering the model element to be displayed based on the value of the selected property or changing the column in which to display the model element based on the value of the selected property.

16. The method of claim 12, wherein the table comprises an additional column or row, and
wherein each cell of the additional column or row comprises a user interface element for selecting table elements.

17. The method of claim 12, further comprising:
receiving a request to generate code;
retrieving additional property information from the data definition tool;
generating production code based on the opened block diagram; and
saving additional information in the data definition tool, the additional information comprising information on the at least one production code file generated.

18. The method of claim 12, wherein the model element is one of a plurality of model elements displayed in a tree view, the tree view allowing for navigating the plurality of model elements.

* * * * *